(12) United States Patent
Kim et al.

(10) Patent No.: US 10,534,740 B2
(45) Date of Patent: Jan. 14, 2020

(54) DEVICE AND METHOD FOR CONTROLLING PRIORITY-BASED VEHICLE MULTI-MASTER MODULE

(71) Applicant: HYUNDAI AUTRON CO., LTD., Seoul (KR)

(72) Inventors: Kee Beom Kim, Seongnam-si (KR); Young Suk Kim, Yongin-si (KR)

(73) Assignee: HYUNDAI AUTRON CO., LTD., Seoul (KR)

( * ) Notice: Subject to any disclaimer, the term of this patent is extended or adjusted under 35 U.S.C. 154(b) by 0 days.

(21) Appl. No.: 16/204,971

(22) Filed: Nov. 29, 2018

(65) Prior Publication Data

US 2019/0179787 A1    Jun. 13, 2019

(30) Foreign Application Priority Data

Dec. 8, 2017    (KR) .......................... 10-2017-0168626

(51) Int. Cl.
*G06F 13/40* (2006.01)
*G06F 13/362* (2006.01)
(Continued)

(52) U.S. Cl.
CPC .......... *G06F 13/4031* (2013.01); *G06F 9/526* (2013.01); *G06F 13/362* (2013.01);
(Continued)

(58) Field of Classification Search
None
See application file for complete search history.

(56) References Cited

U.S. PATENT DOCUMENTS 5,774,731 A * 6/1998 Higuchi .................... G06F 9/52
710/200
6,330,604 B1 * 12/2001 Higuchi .................... G06F 9/52
709/226
(Continued)

FOREIGN PATENT DOCUMENTS

CA    1320281 C * 7/1993    ........... G06F 13/374
JP    02027837 A * 1/1990
(Continued)

OTHER PUBLICATIONS

'Scheduling and Locking in Multiprocessor Real-Time Operating Systems' by Bjorn B. Brandenburg, 2011. (Year: 2011).*

*Primary Examiner* — Steven G Snyder
(74) *Attorney, Agent, or Firm* — Morgan, Lewis & Bockius LLP

(57) ABSTRACT

Provided is a multi-master collision prevention system including: a plurality of functional blocks including a plurality of external modules and a plurality of internal modules performing different functions; a plurality of interfaces respectively connected to the plurality of external modules, respectively; a plurality of dedicated registers including priority information of the plurality of functional blocks and connected to the plurality of functional blocks, respectively; a common block selectively connected to the plurality of functional blocks, and configured to function as a master for controlling the common blocks when the plurality of functional blocks are connected to the common block; and a priority determination unit configured to determine a connection between any one of the plurality of functional blocks and the common block.

5 Claims, 5 Drawing Sheets

(51) Int. Cl.
  *G06F 13/42* (2006.01)
  *G06F 9/52* (2006.01)
  *B60K 6/22* (2007.10)
  *B60R 16/023* (2006.01)

(52) U.S. Cl.
  CPC ............ *G06F 13/4282* (2013.01); *B60K 6/22* (2013.01); *B60R 16/0231* (2013.01); *B60Y 2200/92* (2013.01); *G06F 2213/36* (2013.01)

(56) References Cited

U.S. PATENT DOCUMENTS

| | | | | |
|---|---|---|---|---|
| 6,502,136 | B1* | 12/2002 | Higuchi | G06F 9/52 709/226 |
| 7,765,547 | B2* | 7/2010 | Cismas | G06F 9/3851 712/214 |
| 7,802,263 | B2* | 9/2010 | Fuchs | G06F 9/542 719/314 |
| 8,209,705 | B2* | 6/2012 | Fuchs | G06F 9/542 719/313 |
| 8,566,843 | B2* | 10/2013 | Fuchs | G06F 9/542 719/313 |
| 8,640,129 | B2* | 1/2014 | Cismas | G06F 9/3851 718/100 |
| 8,977,795 | B1* | 3/2015 | Mater | G06F 9/52 710/200 |
| 9,575,817 | B2* | 2/2017 | Fuchs | G06F 9/542 |
| 9,705,765 | B2* | 7/2017 | Fuchs | G06F 9/542 |
| 10,002,036 | B2* | 6/2018 | Fuchs | G06F 9/542 |
| 10,031,790 | B1* | 7/2018 | Fuchs | G06F 9/542 |
| 10,248,477 | B2* | 4/2019 | Fuchs | G06F 9/542 |
| 2004/0128673 | A1* | 7/2004 | Fuchs | G06F 9/542 719/310 |
| 2006/0117316 | A1* | 6/2006 | Cismas | G06F 9/3851 718/103 |
| 2006/0282836 | A1* | 12/2006 | Barker | G06F 9/4887 718/103 |
| 2008/0288954 | A1* | 11/2008 | Fuchs | G06F 9/542 719/310 |
| 2010/0257534 | A1* | 10/2010 | Cismas | G06F 9/3851 718/103 |
| 2011/0246694 | A1* | 10/2011 | Ichinose | G06F 9/526 710/200 |
| 2012/0266184 | A1* | 10/2012 | Fuchs | G06F 9/542 719/313 |
| 2014/0096144 | A1* | 4/2014 | Fuchs | G06F 9/542 719/313 |
| 2017/0123869 | A1* | 5/2017 | Fuchs | G06F 9/542 |
| 2017/0126524 | A1* | 5/2017 | Fuchs | G06F 9/542 |
| 2018/0203749 | A1* | 7/2018 | Fuchs | G06F 9/542 |
| 2019/0004880 | A1* | 1/2019 | Fuchs | G06F 9/542 |
| 2019/0034250 | A1* | 1/2019 | Fuchs | G06F 9/542 |

FOREIGN PATENT DOCUMENTS

| | | | |
|---|---|---|---|
| JP | 02076338 A | * | 3/1990 |
| KR | 10-2003-0027074 A | | 4/2003 |
| KR | 10-2012-0012875 A | | 2/2012 |
| KR | 10-2012-0109051 A | | 10/2012 |

* cited by examiner

FIG. 5A

| | Address | Data | | | |
|---|---|---|---|---|---|
| | | Broadcast flag | Broadcast value | Priority Level | Grobal Config |
| INTERFACE #1 | 0x21 | 0 | 0 | 3 | 0 |
| INTERNAL MODULE #1 | 0x21 | 0 | 0 | 1 | 0 |
| INTERNAL MODULE #2 | 0x21 | 0 | 0 | 2 | 0 |
| INTERFACE #2 | 0x22 | Function 1 | | | |
| COMMON REGISTER | ... | | | | |
| | 0x3F | Function n | | | |

FIG. 5B

| | Address | Data | | | |
|---|---|---|---|---|---|
| | | Broadcast flag | Broadcast value | Priority Level | Grobal Config |
| INTERFACE #1 | 0x21 | 0 | 0 | 0 (update) | 0 |
| INTERNAL MODULE #1 | 0x21 | 0 | 0 | 1 | 0 |
| INTERNAL MODULE #2 | 0x21 | 0 | 0 | 2 | 0 |
| INTERFACE #2 | 0x22 | Function 1 | | | |
| COMMON REGISTER | ... | | | | |
| | 0x3F | Function n | | | |

FIG. 5C

| | Address | Data | | | |
|---|---|---|---|---|---|
| | | Broadcast flag | Broadcast value | Priority Level | Grobal Config |
| INTERFACE #1 | 0x21 | 0 | 0 | 0 | 0 |
| INTERNAL MODULE #1 | 0x21 | 1 (update) | 1 (update) | 1 | 0 |
| INTERNAL MODULE #2 | 0x21 | 1 (update) | 1 (update) | 2 | 0 |
| INTERFACE #2 | 0x21 | 1 (update) | 1 (update) | 3 | 0 |
| COMMON REGISTER | 0x22 | Function 1 | | | |
| | ... | ... | | | |
| | 0x3F | Function n | | | |

DEVICE AND METHOD FOR CONTROLLING PRIORITY-BASED VEHICLE MULTI-MASTER MODULE

CROSS-REFERENCE TO RELATED APPLICATIONS

This U.S. non-provisional patent application claims priority under 35 U.S.C. § 119 of Korean Patent Application No. 10-2017-0168626, filed on Dec. 8, 2017, the entire contents of which are hereby incorporated by reference.

BACKGROUND

The present invention relates to a control device and method for a multi-master module, and more particularly, to a control device and method for a multi-master module capable of controlling the use of a common block on a priority basis in a slave device connected to a plurality of master devices.

Recently, automobiles use many electronic control systems with built-in microcontroller unit, and their use is gradually increasing. The microcontroller unit in a vehicle plays an important role in controlling the functions of each device of the vehicle.

As the electronic control system in the vehicle, there are various systems such as a Hybrid Control Unit (HCU) and an Engine Control Unit (ECU) of a hybrid vehicle. In this case, if the common functions used by each electronic control system, for example, the power supply system and the function safety support functions, may be shared and used, this may be very helpful for cost reduction.

However, even when the common functions are integrated, in order to guarantee the independence of each system, logic and registers should be classified into independent blocks and common blocks according to the function of each block.

In this case, when several systems simultaneously access a commonly used block or when the operation must be processed so that multiple systems may use the common block at high speed, there is a high possibility that a problem such as a collision occurs.

In particular, in this case, a method in which a plurality of masters access a common block in the order of access first is used. However, in the case of a corresponding method, even if the multi-master within the operating clock range is accessed simultaneously or the master selection area is set later, this may be a problem if the corresponding action is an urgent function.

Therefore, it is required to implement an appropriate control method for preventing collision when accessing a common block so that a plurality of master modules may share a common block.

SUMMARY

The present invention has been made to solve the above-mentioned technical problems, and it is an object of the present invention to substantially complement various problems caused by limitations and disadvantages in the prior art, and the present invention relates to a control device and method for a multi-master device capable of controlling the use of a common block in a slave device connected to a plurality of master devices in a priority-based manner.

More specifically, when a plurality of master modules (an external module or an internal module) simultaneously accesses a common block, the present invention may determine the access subject of the corresponding masters based on priority. In particular, to ensure independence when controlling the function of each master, a plurality of masters constitute a unique register area.

In addition, in order to control a common block, each of a plurality of masters sets a master selection register area in a dedicated register area without directly accessing a register area of the corresponding common block.

In this case, the priority of the function to be executed by the master is set in the master selection register area, and the corresponding priority area is compared. If the priority of the function to be executed is higher than the priority of the currently executed function, the priority determination unit may stop the currently executed function and execute the higher priority function. Also, the priority determination unit informs the entire module that a priority determination operation is performed. At this time, among the blocks receiving the corresponding information, the block in which the function operation is stopped may perform the function again.

An embodiment of the inventive concept provides a multi-master collision prevention system including: a plurality of functional blocks including a plurality of external modules and a plurality of internal modules performing different functions; a plurality of interfaces respectively connected to the plurality of external modules, respectively; a plurality of dedicated registers including priority information of the plurality of functional blocks and connected to the plurality of functional blocks, respectively; a common block selectively connected to the plurality of functional blocks, and configured to function as a master for controlling the common blocks when the plurality of functional blocks are connected to the common block; and a priority determination unit configured to determine a connection between any one of the plurality of functional blocks and the common block, wherein when at least two functional blocks among the plurality of functional blocks access the common block at the same time, the priority determination unit determines whether one of the at least two functional blocks and the common block are connected based on priority information of the at least two functional blocks, and broadcasts or multicasts the priority information of the determined functional block to at least some of the plurality of dedicated registers.

In an embodiment, each of the plurality of dedicated registers may include a priority selection register area, and the priority selection register area may store priority information of a functional block corresponding to a corresponding dedicated register.

In an embodiment, the priority selection register area may include: a broadcasting flag indicating that the priority determination unit is connected to one of the at least two functional blocks that attempt to access simultaneously; a broadcasting value indicating a priority value of one functional block connected to the common block; and a priority value of a functional block corresponding to the priority selection register area.

In an embodiment, when any one functional block among the plurality of functional blocks is already connected to the common block, the priority determination unit may compare priority information of a functional block that attempts to access the common block with priority information of a functional block that is already connected, wherein when the priority of the functional block that attempts to access the common block is higher than the priority of the functional block that is already connected, the priority determination unit may stop connection of the already-connected functional block and the common block, attempt to access the common block, and connect a functional block having a higher priority.

In an embodiment, the priority determination unit may broadcast or multicast a priority value of a disconnected module as the broadcasting value.

In an embodiment of the inventive concept, a multi-master collision prevention method in a multi-master collision prevention system including: a plurality of functional blocks including a plurality of external modules and a plurality of internal modules performing different functions; a plurality of interfaces respectively connected to the plurality of external modules, respectively; a plurality of dedicated registers including priority information of the plurality of functional blocks and connected to the plurality of functional blocks, respectively; a common block selectively connected to the plurality of functional blocks, and configured to function as a master for controlling the common blocks when the plurality of functional blocks are connected to the common block; and a priority determination unit configured to determine a connection between any one of the plurality of functional blocks and the common block, the method including: accessing, by at least two functional blocks among the plurality of functional blocks, the common block at the same time; comparing priority information of the at least two functional blocks; determining a connection between any one of the at least two functional blocks and the common block based on the comparison result; and broadcasting or multicasting the priority information of the any one connected functional block to some of the plurality of dedicated registers.

In an embodiment, the method may further include changing priority information of a functional block that attempts to access the common block among the plurality of functional blocks.

In an embodiment, each of the plurality of dedicated registers may include a priority selection register area, and the priority selection register area stores priority information of a functional block corresponding to a corresponding dedicated register.

In an embodiment, the priority selection register area may include: a broadcasting flag indicating that the priority determination unit is connected to one of the at least two functional blocks that attempt to access simultaneously; a broadcasting value indicating a priority value of one functional block connected to the common block; and a priority value of a functional block corresponding to the priority selection register area.

In an embodiment, the method may further include, when any one functional block among the plurality of functional blocks is already connected to the common block, comparing priority information of a functional block that attempts to access the common block with priority information of a functional block that is already connected; and when the priority of the functional block that attempts to access the common block is higher than the priority of the functional block that is already connected, stopping connection of the already-connected functional block and the common block, attempting to access the common block, and connecting a functional block having a higher priority.

In an embodiment, the method may further include broadcasting or multicasting a priority value of a disconnected module as the broadcasting value.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIGS. 5A, 5B and 5C are views illustrating a change in a priority selection register value according to an operation of a multi-master and an integrated device according to an embodiment of the present invention.

DETAILED DESCRIPTION

The following content merely illustrates the principles of the invention. Therefore, those skilled in the art will be able to devise various devices which, although not explicitly described or illustrated herein, embody the principles of the invention and are included in the concept and scope of the invention. Furthermore, all of the conditional terms and embodiments listed herein are, in principle, intended to be purely for purposes of understanding the concepts of the invention, and are not to be construed as limited to the specifically recited embodiments and conditions.

The above objects, features and advantages will be described in detail below with reference to the accompanying drawings, and accordingly, those skilled in the art may easily implement the technical idea of the present invention.

Figure 1:
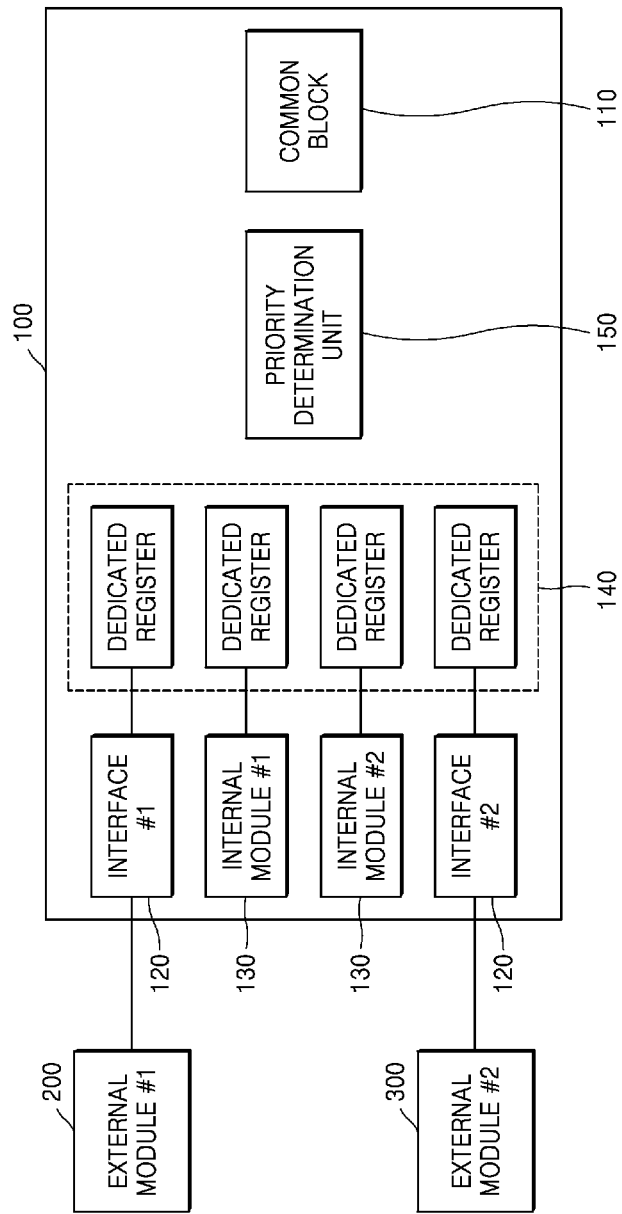
FIGS. 1 and 2 show a block diagram of an integrated device connected to a multi-master according to an embodiment of the present invention.

FIG. 1 is a block diagram of a multi-master collision prevention system including an integrated device connected to a multi-master according to an embodiment of the present invention.

The multi-master collision prevention system of the present invention may include a plurality of functional blocks including a plurality of external modules (the first external module 200 and the second external module 300) and a plurality of internal modules.

The plurality of external modules 200 and 300 are modules existing outside the integrated device 100. Preferably, the external modules 200 and 300 are external systems (or chips) that may operate as masters and are connected to the interface of the integrated device 100. For example, the external modules 200 and 300 may be a Hybrid Control Unit (HCU), a Microcontroller unit of an Engine Control Unit (ECU), a Vehicle Controller (VCU) of an Electric Vehicle, a Motor Controller (MCU), a Low Voltage DC-DC Converter (LDC), and the like.

Meanwhile, the integrated device 100 includes a plurality of interfaces 120, a plurality of internal modules 130, a plurality of dedicated registers 140 connected to the plurality of internal modules and external modules, a priority determination unit 150, and a common block 110. At this time, the integrated device 100 may be, for example, an integrated power system for a vehicle that supplies power to the motor and the engine of the hybrid vehicle.

The plurality of interfaces 120 are configured to connect the external modules 200 and 300 and the corresponding dedicated registers 140 and common block 110 in the integrated device 100. In this embodiment, the plurality of interfaces 120 may be, for example, a Serial Peripheral Interface (SPI) communication module. However, the plurality of interfaces 120 are not limited to the SPI communication module, and for example, may be various types of interfaces such as a Controller Area Network (CAN) or a Local Interconnect Network (LIN).

Figure 2:
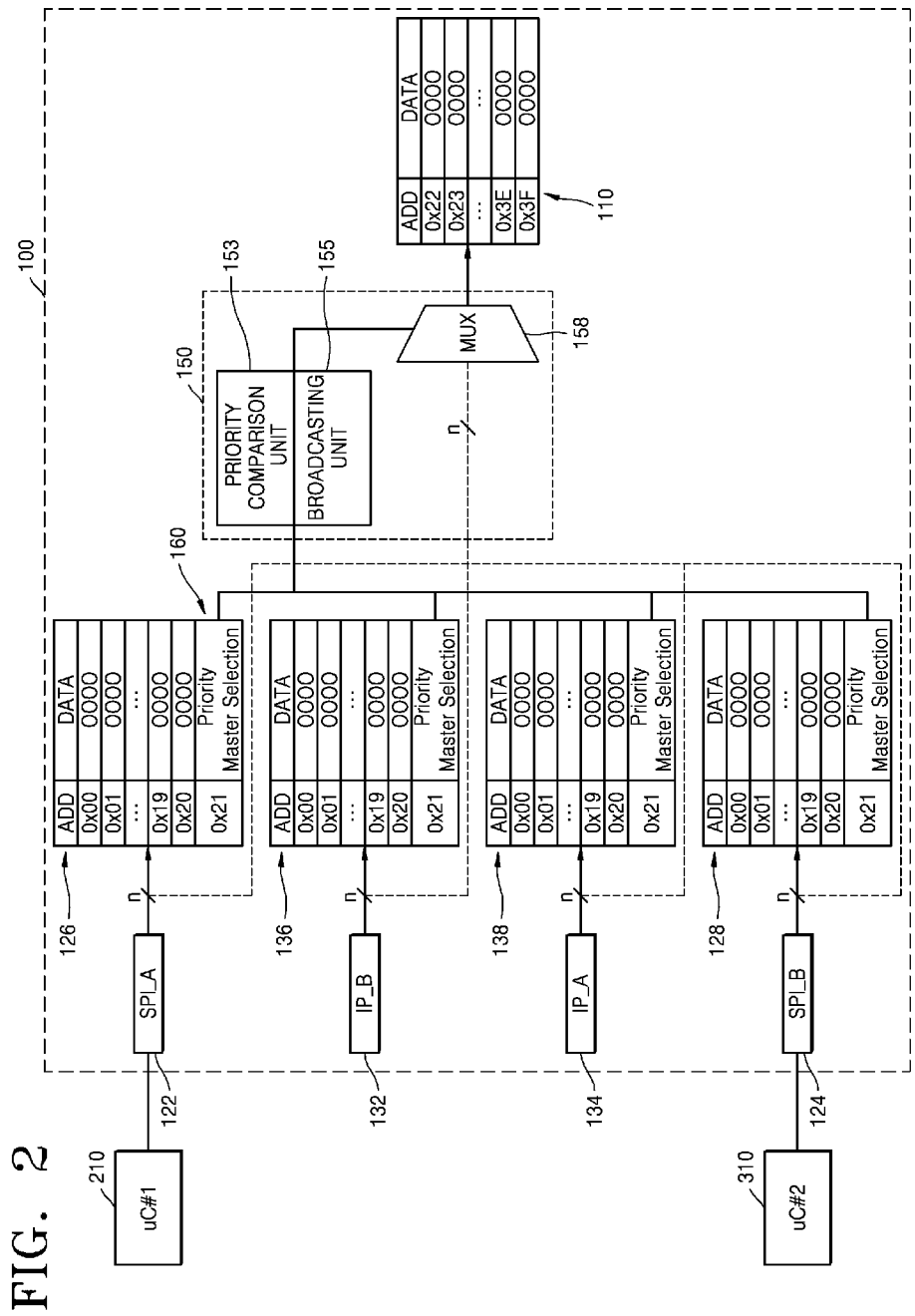

When the interface 120 connected to the first external module 200, that is, the first communication unit 122 of FIG. 2, is an SPI, the first external module 200 may operate as a master with respect to the first communication unit 122. That is, the first external module 200 operates as a master by providing a chip select signal and a clock to the first communication unit 122, and the first communication unit 122 may operate as a slave.

Meanwhile, the internal module 130 may be an independent functional block in the integrated device 100, and for example, may be a control block or an internal memory block. For example, it may be implemented as a semiconductor intellectual property (IP). For example, if the integrated device 100 is a power system chip, the internal module 130 may be an IP for controlling the power system. Or the internal module 130 may be a power system chip internal memory.

The plurality of dedicated registers 140 are registers for storing information necessary for operation of a plurality of functional blocks (e.g., the internal module 130 or the external modules 200 and 300), and are connected to the corresponding internal module 130 or interface 120 on a one-to-one basis. In this case, the plurality of dedicated registers 140 include a priority selection register area 160 including priority information of the corresponding internal module 130 or external modules 200 and 300 connected on a one-to-one basis. And, it is connected to the priority determination unit 150.

The priority determination unit 150 may be connected to the plurality of dedicated registers 140 to read priority information based on a base address and the functional block having the highest priority among the plurality of functional blocks may be connected to access the register of the common block 110. Also, when a functional block accessing the register of the common block 110 is changed by a priority operation, that is, by an operation of suspending or stopping access according to the priority, the change may be broadcast or multicast through the plurality of dedicated registers 140.

The register of the common block 110 is a register for storing information necessary for operation of the common block of the integrated device 100. It is possible to write or read necessary information from the external or internal module determined by the above-described priority determination unit 150.

Hereinafter, an embodiment of a multi-master collision prevention system according to the present invention will be described with reference to FIG. 2.

In the multi-master collision prevention system according to the present invention, the first external module 210 is, for example, a micro-controller of a Hybrid Control Unit (HCU), and the second external module 310 may be, for example, a microcontroller of an Engine Control Unit (ECU).

The first and second interfaces 122 and 124 may be implemented as an SPI communication module.

The plurality of dedicated registers 126, 136, 138, and 128 are registers that are used independently by a plurality of external modules 210 and 310 and a plurality of internal modules 130, respectively. For example, the dedicated register 126 connected to the first external module 210 may be a register for performing an operation related to the HCU independently. In addition, the dedicated register 128 connected to the second external module 124 may be a register for performing an operation related to the ECU independently.

If the integrated device 100 is an automotive power system, the common block 110 may be a common block such as a real time clock (RTC), a low side driver (LSD), and a high side driver (HSD) in the integrated device 100.

The priority determination unit 150 may include a priority comparison unit 155, a broadcasting unit 155, and a selection unit 158. In addition, the priority determination unit 150 is connected to the priority selection register area 160, which is included in each of the plurality of dedicated registers 126, 136, 138, and 128.

The priority comparison unit 155 may receive priority information from the priority selection register area 160 included in the plurality of dedicated registers 126, 136, 138 and 128, and may control the selection unit 158 based on the priority information. For example, the priority information may be a priority level 440, and the priority may be given higher in descending order of the priority level.

For example, when the priority level of the first dedicated register 126 is '0' and the priority level of the second dedicated register 136 is '1', it is assumed that the first external module 210 and the first internal module 132 access the register of the common block 110 at the same time. At this time, the priority comparison unit 153 may control the selector 158 so that the first external module 210 connected to the first dedicated register 126 having a low priority level may access the priority register.

In the case of concurrent access, or if a previously accessing module is pending or suspended in priority order, the broadcasting unit 155 may broadcast or multicast a priority level and a priority operation status of the corresponding pending or suspended module.

The selection unit 158 may selectively connect the common block 110 with a module having a high priority (or a low priority level). The selection unit 158 may be implemented with, for example, a multiplexer (MUX).

Through this configuration, when a plurality of external or internal modules access the common block 110 of the integrated device 100 at the same time, the multi-master collision prevention system according to the present invention may perform the use of the common block without collision based on the priority information. Or, even if another external or internal module already uses the common block, in a case where an external or internal module requires the use of highly urgent features, the multi-master collision prevention system according to the present invention may control the functions of other modules with low urgency to be performed again after the urgent functions are executed first.

Moreover, the operation of this multi-master collision prevention system is as follows.

First, when an external module or an internal module attempts to access a register of the common block 110, the priority determination unit 150 may connect an external or internal module that attempts to access the common block 110, so that the function of the corresponding external or internal module may be performed.

Meanwhile, when several masters (external or internal modules) attempt to access the registers of the common block 110, the priority determination unit 150 obtains a priority level from the priority selection register area 160 of the corresponding module and compares the priority levels of the modules.

The priority determination unit 150 may control the function of the higher priority module to be performed first based on the comparison result. Alternatively, if the priority levels are the same, the priority determination unit 150 may control the function of the module that first attempts to access to be performed first.

Or, if a function having a low priority already uses a register of the common block 110 and a module having a high priority is attempting to access a register of the common block 110, the priority determination unit 150 may stop the connection between the module of the lower priority function and the register of the common block 110 and may control the high-priority function module to be connected to the register of the common block 110 so that the corresponding function is performed first.

In this case, the broadcasting unit 158 of the priority determination unit 150 broadcasts whether or not a priority operation is performed on another external or internal module and the priority levels of the interrupted function. Alternatively, the broadcasting unit 158 of the priority determination unit 150 may multicast whether the priority determination operation is performed and the priority level of the interrupted function to the modules that attempt to access it at the same time.

At this time, the module with the lower priority function that attempts to access the register of the common block 110 continuously, so that after the execution of the function with the higher priority is completed, lower priority functions may be performed.

Meanwhile, although FIG. 2 shows only two internal modules for the sake of simplicity, the present invention is not limited thereto, and there may be two or more internal modules.

Hereinafter, the data structure of the priority selection register 160 will be described with reference to FIG. 3.

Figure 3:
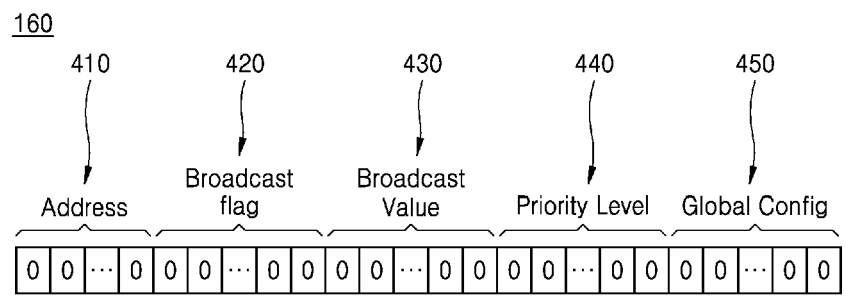
FIG. 3 is a view illustrating a data structure of a priority selection register according to an embodiment of the present invention.

As shown in FIG. 3, the priority selection register 160 includes an address portion 410, a broadcast flag 420, a broadcast value 430, a priority level 440, and an area of a global configuration 450.

The address portion 410 indicates an address on the register of the corresponding data.

The broadcast flag 420 relates to whether or not to perform a priority operation. That is, it is an area indicating whether an operation of holding or stopping the access of the colliding external or internal module is performed according to the priority.

The broadcast value 430 indicates the priority level of the operation that is suspended or stopped as the priority operation is performed.

The priority level 440 is a value based for determining the master to control the common block. For example, if the priority level is small, it may mean high priority.

For example, when the priority level of the first dedicated register 126 is '0' and the priority level of the second dedicated register 136 is '1', the priority determination unit 150 may control the function, which is to be performed by the first external module 210 connected to the first dedicated register 126, to have a higher priority than the function, which is to be performed by the first internal module 132 connected to the second dedicated register 136.

The global configuration 450 is a register value required for the internal or external modules 210 and 310 to perform the function of the common block 110, and performs a common block function based on the data in the area of the global configuration 450.

Figure 4:
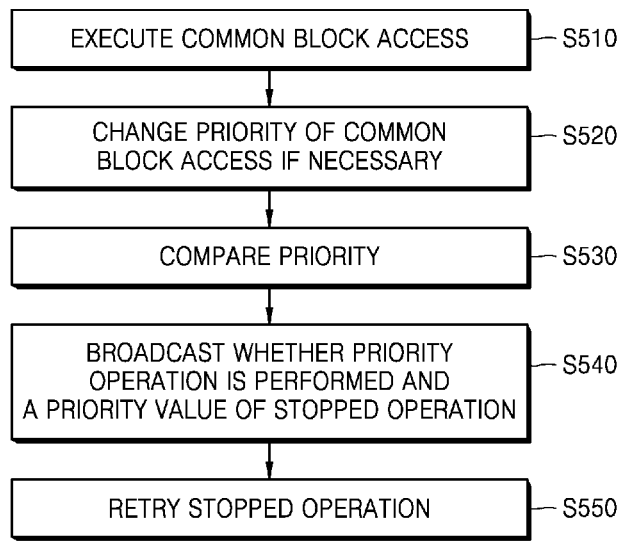
FIG. 4 is a flowchart illustrating operations of a multi-master and an integrated device according to an embodiment of the present invention.

Hereinafter, the operation of the multi-master collision prevention system according to an embodiment of the present invention will be described in detail with reference to FIGS. 4 and FIGS. 5A to 5B.

First, as shown in FIG. 5A, it is assumed that initially, the priority level of the first interface 122 is set to '3', the priority level of the first internal module 132 is set to '1', the priority level of the second internal module 134 is set to '2' and the priority level of the second interface 124 is set to '3'.

Also, a case where the first internal module 132 attempts to access the registers of the common interface 110 and the first interface 122 at the same time, or a case where a function with a lower priority already uses the register of the common block 110 and a module having a higher priority function attempts to access the register of the common block 110 will be described in detail.

First, the first external module 210 attempts to access the register of the common block 110 (step S510). In this case, when the function to be performed by the first external module 210 is a function requiring urgency such as a vehicle failure notification, the priority level of the initial first interface 122 connected to the initial first external module 210 may be updated from '3' to '0' (step S520, see FIG. 5B).

In this case, if the first internal module 132 attempts to access the register of the common block 110 concurrently with the first external module 210 or if the function of the first internal module 132 is performed first, the priority determination unit 150 compares the priority levels of the first internal module 132 and the first external module 210. That is, the priority level '1' of the first internal module 132 and the priority level '0' of the first external module 210 may be compared (step S530, see FIG. 5B).

Preferably, the priority determination unit 150 checks the master (external or internal module) attempting to access the register of the common block 110 based on the base address (0x21 in FIGS. 5A to 5B) of the priority selection register area 160 of the external or internal module that attempts to access each clock.

As described above, when access to the register of the common block 110 of the first internal module 132 is suspended or interrupted by the priority determination unit 150, that is, when the priority operation is performed, whether the priority operation is performed and the priority level of the module whose access is suspended or stopped may be broadcast or multicasted (step S540).

As above, when whether the priority operation is performed and the priority level of the module whose access is suspended or stopped are broadcast or multicasted, as shown in FIG. 5C, the broadcast flag 420 and the broadcast value 430 of the priority selection register area 160 of the dedicated register 140 are updated.

As described above, the broadcast flag 420 is information on a priority operation status, and the broadcast value 430 corresponds to a priority level of a module whose access is suspended or stopped.

Finally, when the priority level of a module whose access is suspended or stopped through the broadcast value ('1') is equal to its own priority level (or the same or a higher priority level), the first internal module 132 whose access is suspended or interrupted by the priority operation continues to retry the interrupted operation.

Therefore, according to the present invention, it is possible to integrate a plurality of systems, which conventionally operate as slaves, into one system and solve the problems due to integration.

At this time, in the integrated system, by dividing the resources available to the multi-master into independent blocks and shared blocks based on a register area, the cost and complexity of existing systems may be significantly improved while ensuring the independence of each system. And, if several multi-masters access a common block simultaneously or if it is a late-action but needs to perform a very important function quickly, it solves potential problems to significantly improve system safety.

Meanwhile, although the present invention has been described with reference to the embodiments shown in the drawings, it is only illustrative, and it will be understood by those skilled in the art that various changes and modifications may be made without departing from the scope of the present invention. Accordingly, the true scope of the present invention should be determined by the technical idea of the appended claims.

What is claimed is:

1. A multi-master collision prevention system comprising:
   a plurality of functional blocks including a plurality of external modules and a plurality of internal modules performing different functions;
   a plurality of interfaces respectively connected to the plurality of external modules, respectively;
   a plurality of dedicated registers including priority information of the plurality of functional blocks and connected to the plurality of functional blocks, respectively;
   a common block selectively connected to the plurality of functional blocks; and
   a priority determination unit configured to determine a connection between any one of the plurality of functional blocks and the common block,
   wherein when at least two functional blocks among the plurality of functional blocks access the common block at the same time, the priority determination unit determines whether one of the at least two functional blocks and the common block are connected based on priority information of the at least two functional blocks, and broadcasts or multicasts the priority information of the determined functional block to at least some of the plurality of dedicated registers,
   wherein each of the plurality of dedicated registers comprises a priority selection register area, and the priority selection register area stores priority information of a functional block corresponding to a corresponding dedicated register,
   wherein the priority selection register area comprises:
      a broadcasting flag indicating that the priority determination unit is connected to one of the least two functional blocks that attempt to access simultaneously;
      a broadcasting value indicating a priority value of one functional block connected to the common block; and
      a priority value of a functional block corresponding to the priority selection register area,
   wherein the broadcast flag indicates whether an operation of holding or stopping an access of the at least two functional blocks is performed according to the priority information, and
   wherein the broadcasting value indicates the priority of the operation that is holded or stopped.

2. The multi-master collision prevention system of claim 1, wherein when any one functional block among the plurality of functional blocks is already connected to the common block, the priority determination unit compares priority information of a functional block that attempts to access the common block with priority information of a functional block that is already connected,
   wherein when the priority of the functional block that attempts to access the common block is higher than the priority of the functional block that is already connected, the priority determination unit stops connection of the already-connected functional block and the common block, attempts to access the common block, and connects a functional block having a higher priority, and
   wherein the priority determination unit broadcasts or multicasts a priority value of a disconnected module as the broadcasting value.

3. A multi-master collision prevention system comprising:
   a plurality of functional blocks including a plurality of external modules and a plurality of internal modules performing different functions;
   a plurality of interfaces respectively connected to the plurality of external modules, respectively;
   a plurality of dedicated registers including priority information of the plurality of functional blocks and connected to the plurality of functional blocks, respectively;
   a common block selectively connected to the plurality of functional blocks; and
   a priority determination unit configured to determine a connection between any one of the plurality of functional blocks and the common block,
   wherein when at least two functional blocks among the plurality of functional blocks access the common block at the same time, the priority determination unit determines whether one of the at least two functional blocks and the common block are connected based on priority information of the at least two functional blocks, and broadcasts or multicasts the priority information of the determined functional block to at least some of the plurality of dedicated registers,
   wherein each of the plurality of dedicated registers comprises a priority selection register area, and the priority selection register area stores priority information of a functional block corresponding to a corresponding dedicated register,
   wherein the priority selection register area comprises:
      a broadcasting flag indicating that the priority determination unit is connected to one of the at least two functional blocks that attempt to access simultaneously;
      a broadcasting value indicating a priority value of one functional block connected to the common block; and
      a priority value of a functional block corresponding to the priority selection register area,
   wherein when any one functional block among the plurality of functional blocks is already connected to the common block, the priority determination unit compares priority information of a functional block that attempts to access the common block with priority information of a functional block that is already connected,
   wherein when the priority of the functional block that attempts to access the common block is higher than the priority of the functional block that is already connected, the priority determination unit stops connection of the already-connected functional block and the common block, attempts to access the common block, and connects a functional block having a higher priority, and
   wherein the priority determination unit broadcasts or multicasts a priority value of a disconnected module as the broadcasting value.

4. A multi-master collision prevention method in a multi-master collision prevention system comprising: a plurality of functional blocks including a plurality of external modules and a plurality of internal modules performing different functions; a plurality of interfaces respectively connected to the plurality of external modules, respectively; a plurality of dedicated registers including priority information of the plurality of functional blocks and connected to the plurality of functional blocks, respectively; a common block selectively connected to the plurality of functional blocks; and a priority determination unit configured to determine a connection between any one of the plurality of functional blocks and the common block, the method comprising:

accessing, by at least two functional blocks among the plurality of functional blocks, the common block at the same time;

comparing priority information of the at least two functional blocks;

determining a connection between any one of the at least two functional blocks and the common block based on the comparison result; and broadcasting or multicasting the priority information of the any one connected functional block to some of the plurality of dedicated registers, wherein each of the plurality of dedicated registers comprises a priority selection register area, and the priority selection register area stores priority information of a functional block corresponding to a corresponding dedicated register, wherein the priority selection register area comprises:

a broadcasting flag indicating that the priority determination unit is connected to one of the at least two functional blocks that attempt to access simultaneously;

a broadcasting value indicating a priority value of one functional block connected to the common block; and a priority value of a functional block corresponding to the priority selection register area, wherein the method further comprising when any one functional block among the plurality of functional blocks is already connected to the common block, comparing priority information of a functional block that attempts to access the common block with priority information of a functional block that is already connected, when the priority of the functional block that attempts to access the common block is higher than the priority of the functional block that is already connected, stopping connection of the already-connected functional block and the common block, attempting to access the common block, and connecting a functional block having a higher priority, and wherein the method further comprising broadcasting or multicasting a priority value of a disconnected module as the broadcasting value.

5. The method of claim 4, further comprising changing priority information of a functional block that attempts to access the common block among the plurality of functional blocks.

* * * * *